United States Patent
Kim et al.

(10) Patent No.: US 9,450,729 B2
(45) Date of Patent: Sep. 20, 2016

(54) METHOD AND DEVICE FOR ALLOCATING A DOWNLINK CONTROL CHANNEL IN A WIRELESS COMMUNICATION SYSTEM

(75) Inventors: Ki Tae Kim, Anyang-si (KR); Jin Young Chun, Anyang-si (KR); Su Nam Kim, Anyang-si (KR); Ji Won Kang, Anyang-si (KR); Bin Chul Ihm, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 170 days.

(21) Appl. No.: 14/125,282

(22) PCT Filed: Jun. 14, 2012

(86) PCT No.: PCT/KR2012/004678
§ 371 (c)(1),
(2), (4) Date: Dec. 10, 2013

(87) PCT Pub. No.: WO2012/173394
PCT Pub. Date: Dec. 20, 2012

(65) Prior Publication Data
US 2014/0112283 A1   Apr. 24, 2014

Related U.S. Application Data

(60) Provisional application No. 61/497,083, filed on Jun. 15, 2011.

(51) Int. Cl.
*H04L 5/00* (2006.01)
*H04W 72/12* (2009.01)

(52) U.S. Cl.
CPC .......... *H04L 5/0053* (2013.01); *H04L 5/0094* (2013.01); *H04W 72/1289* (2013.01)

(58) Field of Classification Search
CPC ... H04L 5/0053; H04L 5/0094; H04L 5/001; H04L 1/1861; H04L 5/0035; H04L 5/0037; H04W 72/1289; H04W 72/042; H04J 11/0083
See application file for complete search history.

(56) References Cited

U.S. PATENT DOCUMENTS

| 2011/0075624 A1* | 3/2011 | Papasakellariou .... H04L 5/0053 370/329 |
| 2011/0170496 A1* | 7/2011 | Fong ..................... H04L 5/0053 370/329 |

(Continued)

FOREIGN PATENT DOCUMENTS

| KR | 10-2011-0020732 | 3/2011 |
| KR | 10-2011-0059773 | 6/2011 |

(Continued)

*Primary Examiner* — Hoang-Chuong Vu
(74) *Attorney, Agent, or Firm* — Lee, Hong, Degerman, Kang & Waimey; Jonathan Kang; Richard C. Salfelder

(57) ABSTRACT

Provided are a method and device for allocating a downlink control channel in a wireless communication system. A base station allocates an enhanced physical control format indicator channel (e-PCFICH) to a control region of a plurality of resource blocks (RBs), transmits, to a terminal, an enhanced physical downlink control channel (e-PDCCH) indicator including information for indicating the start position of an e-PDCCH allocated to a data region of the plurality of RBs, and allocates the e-PDCCH to the data region of the plurality of RBs on the basis of the e-PDCCH indicator.

5 Claims, 13 Drawing Sheets

(56) References Cited

U.S. PATENT DOCUMENTS

| | | | | |
|---|---|---|---|---|
| 2011/0249633 A1* | 10/2011 | Hong | ............... | H04L 5/0053 370/329 |
| 2011/0255505 A1* | 10/2011 | Liu | ............... | H04L 5/0007 370/330 |
| 2012/0106465 A1* | 5/2012 | Haghighat | ............... | H04W 72/1289 370/329 |
| 2012/0147846 A1* | 6/2012 | Ho | ............... | H04W 72/042 370/330 |
| 2012/0294248 A1* | 11/2012 | Seo | ............... | H04W 24/00 370/329 |

FOREIGN PATENT DOCUMENTS

| | | |
|---|---|---|
| WO | 2010/053984 | 5/2010 |
| WO | 2010/076300 | 7/2010 |

* cited by examiner

METHOD AND DEVICE FOR ALLOCATING A DOWNLINK CONTROL CHANNEL IN A WIRELESS COMMUNICATION SYSTEM

CROSS-REFERENCE TO RELATED APPLICATIONS

This application is the National Stage filing under 35 U.S.C. 371 of International Application No. PCT/KR2012/004678, filed on Jun. 14, 2012, which claims the benefit of U.S. Provisional Application Ser. No. 61/497,083, filed on Jun. 15, 2011, the contents of which are all hereby incorporated by reference herein in their entirety.

BACKGROUND OF THE INVENTION

1. Field of the Invention

The present invention relates to wireless communications and more particularly, a method and apparatus for allocating a downlink control channel in a wireless communication system including distributed multi-nodes.

2. Related Art

The next-generation multimedia wireless communication systems which are recently being actively researched are required to process and transmit various pieces of information, such as video and wireless data as well as the initial voice-centered services. The $4^{th}$ generation wireless communication systems which are now being developed subsequently to the $3^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler Effect resulting from the mobility of a user equipment. A variety of techniques are being developed in order to overcome the abnormal characteristics of the wireless channel and to increase the reliability of wireless communication.

Meanwhile, with the employment of machine-to-machine (M2M) communication and with the introduction and distribution of various devices such as a smart phone, a table personal computer (PC), etc., a data requirement size for a cellular network is increased rapidly. To satisfy a high data requirement size, various techniques are under development. A carrier aggregation (CA) technique, a cognitive radio (CR) technique, or the like for effectively using more frequency bands are under research. In addition, a multiple antenna technique, a multiple base station cooperation technique, or the like for increasing data capacity within a limited frequency are under research. That is, eventually, the wireless communication system will be evolved in a direction of increasing density of nodes capable of accessing to an area around a user. A wireless communication system having nodes with higher density can provide a higher performance through cooperation between the nodes. That is, a wireless communication system in which each node cooperates has a much higher performance than a wireless communication system in which each node operates as an independent base station (BS), advanced BS (ABS), node-B (NB), eNode-B (eNB), access point (AP), etc.

A distributed multi-node system (DMNS) comprising a plurality of nodes within a cell may be used to improve performance of a wireless communication system. The DMNS may include a distributed antenna system (DAS), a radio remote head (RRH), and so on. Also, standardization work is underway for various multiple-input multiple-output (MIMO) techniques and cooperative communication techniques already developed or applicable in a future so that they can be applied to the DMNS. Link quality is expected to be improved by employing the DMNS. However, introduction of a new control channel is also required for application of various MIMO techniques and cooperative techniques to the DMNS.

A method for allocating a new control channel for a multi-node system efficiently is required.

SUMMARY OF THE INVENTION

The present invention provides a method and apparatus for allocating a downlink control channel in a wireless communication system. The present invention provides a method for allocating a new downlink control channel to support a plurality of nodes in a multi-node system comprising a plurality of nodes in one or multiple cells. The present invention defines an enhanced physical control format indicator channel (e-PCFICH) indicating position information of a new downlink control channel to support a plurality of nodes.

In an aspect, a method for allocating, by a base station, a downlink control channel in a wireless communication system is provided. The method includes allocating an enhanced physical control format indicator channel (e-PCFICH) to a control region of a plurality of resource blocks (RBs), transmitting to a user equipment an enhanced physical downlink control channel (e-PDCCH) indicator including information indicating a start position of an e-PDCCH allocated to a data region of the plurality of RBs through the e-PCFICH, and allocating the e-PDCCH to the data region of the plurality of RBs based on the e-PDCCH indicator.

The e-PCFICH may be allocated to a common search space (CSS) which is a region, in the control region, searched by all user equipments commonly.

The e-PDCCH indicator may be a bitmap indicating a start position of the e-PDCCH for each RB.

The e-PDCCH indicator may further include information indicating a total length of RBs to which the e-PDCCH is allocated.

The plurality of RBs may be RBs in a virtual RB (VRB) region.

The method may further include transmitting to the user equipment VRB type information indicating type of allocation of the plurality of RBs in the VRB region.

The e-PDCCH indicator may be a bitmap indicating a start position of the e-PDCCH in a unit of RB bundle which includes a plurality of RBs.

The position at which the e-PDCCH starts in each RB bundle may be changed by signaling.

The number of RBs included in the RB bundle may be the same as the size of a resource block group (RBG).

The e-PDCCH indicator may be a bitmap of a fixed length indicating a start position of the e-PDCCH, and the e-PDCCH may be allocated to a part of RBs in an entire system bandwidth.

The e-PCFICH may be allocated to a user equipment-specific search space (USS) which is a region, in the control region, searched by a specific user equipment.

The method may further include transmitting a downlink control signal through the e-PDCCH.

The base station may include a plurality of nodes.

The plurality of nodes may have the same cell identifier (ID) or cell IDs different from one another.

In another aspect, a method for detecting, by a user equipment, a downlink control channel in a wireless communication system is provided. The method includes receiving from a base station an enhanced physical downlink control channel (e-PDCCH) indicator transmitted through an enhanced physical control format indicator channel (e-PCFICH) allocated to a control region of a plurality of resource blocks (RBs), allocating the e-PDCCH to a data region of the plurality of RBs based on the e-PDCCH indicator, and detecting the e-PDCCH by performing blind decoding. The e-PDCCH indicator includes information indicating a start position of an e-PDCCH allocated to the data region of the plurality of RBs.

An e-PDCCH for a multi-node system can be allocated efficiently.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). $3^{rd}$ generation partnership project (3GPP) long term evolution (LTE) is part of an evolved UMTS (E-UMTS) using the E-UTRA, which employs the OFDMA in downlink and the SC-FDMA in uplink. LTE-advanced (LTE-A) is an evolution of 3GPP LTE.

Hereinafter, for clarification, LTE-A will be largely described, but the technical concept of the present invention is not meant to be limited thereto.

Figure 1:
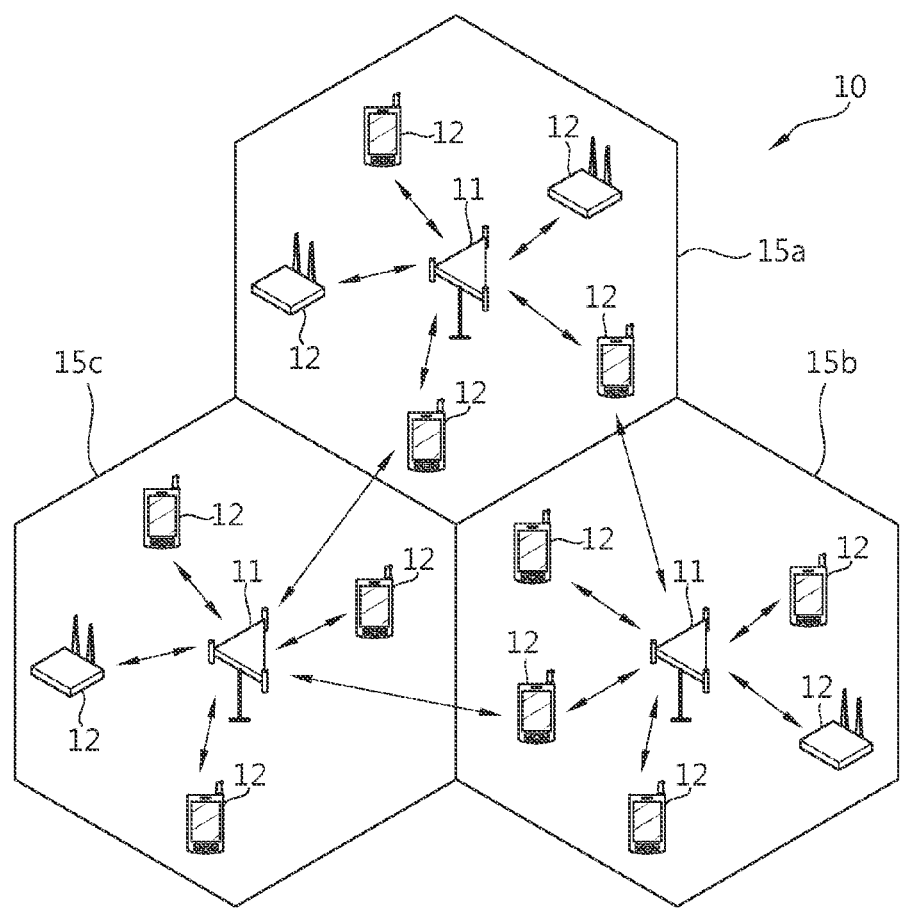
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile user equipment (MT), user equipment (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
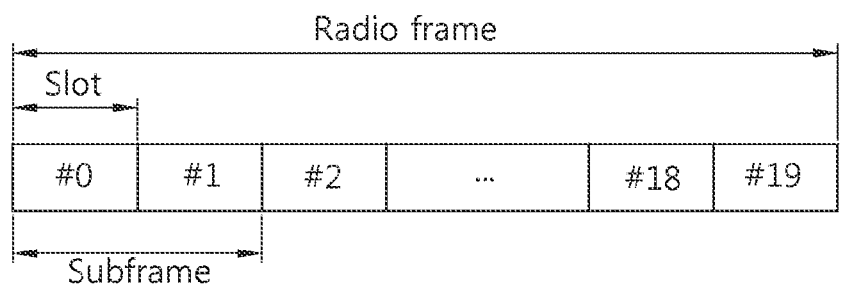
FIG. 2 shows a structure of a radio frame in 3GPP LTE.

FIG. 2 shows a structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008 March). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

Figure 3:
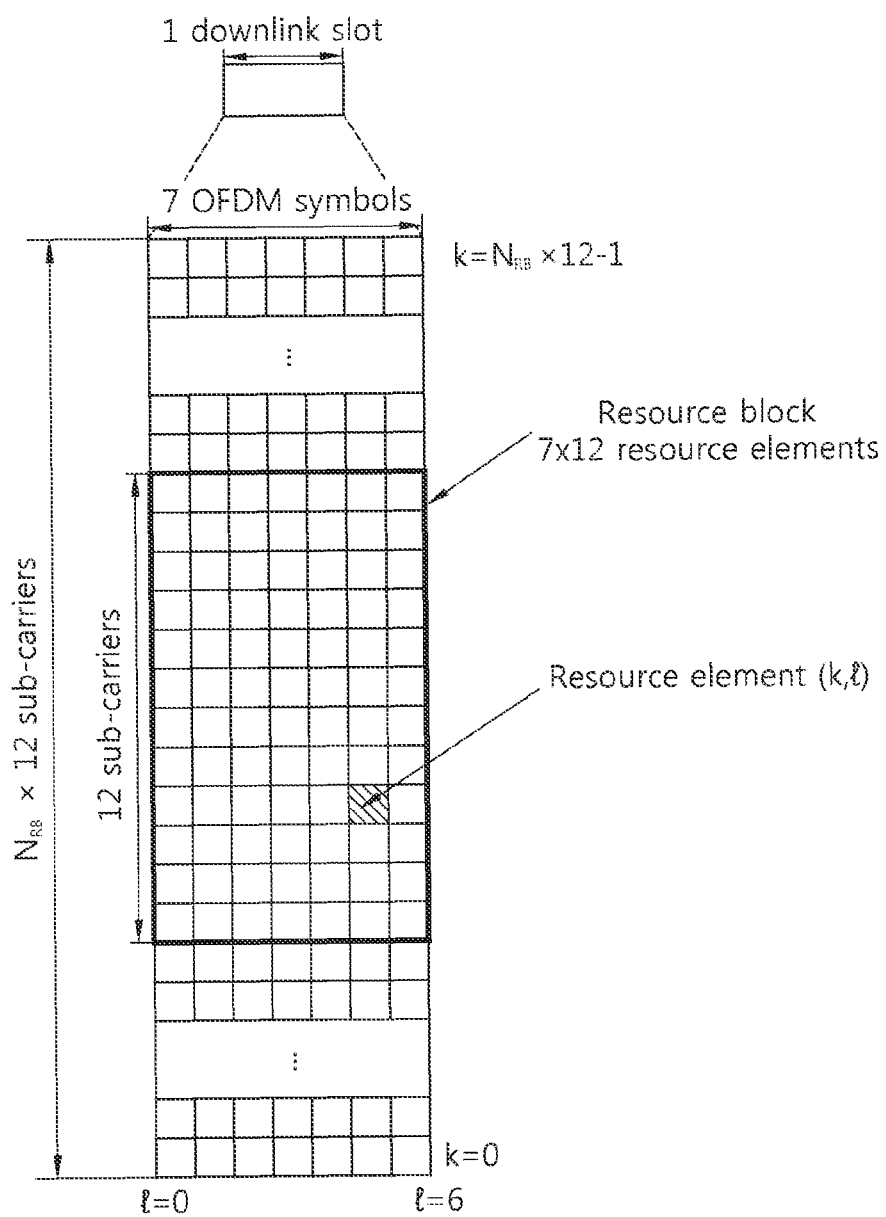
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 6 to 110. One resource block includes a plurality of subcarriers in the frequency domain. An uplink slot may have the same structure as that of the downlink slot.

Each element on the resource grid is called a resource element. The resource elements on the resource grid can be identified by a pair of indexes (k,l) in the slot. Here, k (k=0, . . . , $N_{RB} \times 12-1$) is a subcarrier index in the frequency domain, and 1 is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a CP, frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
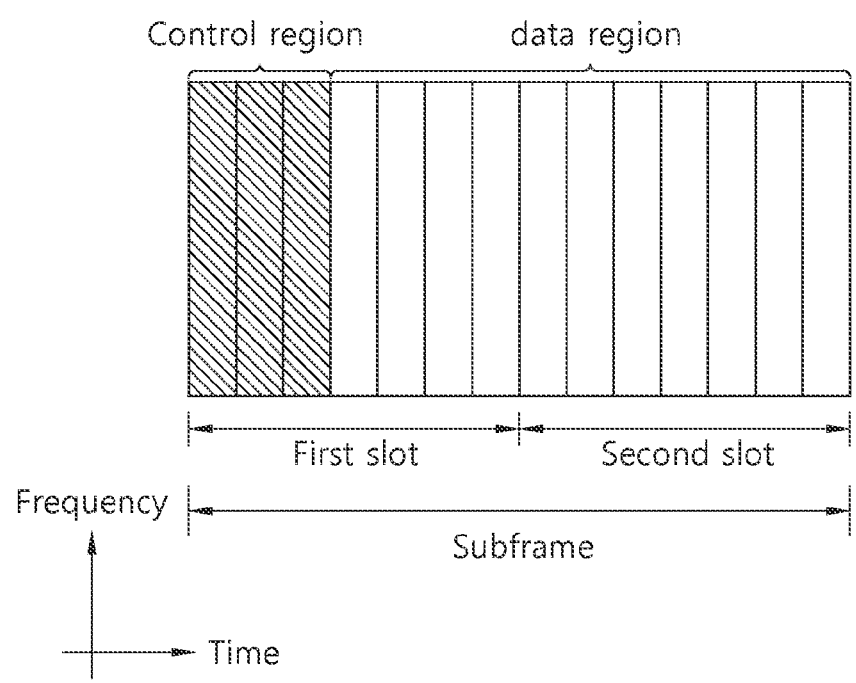
FIG. 4 shows a structure of a downlink subframe.

FIG. 4 shows a structure of a downlink subframe.

A downlink subframe includes two slots in the time domain, and each of the slots includes seven OFDM symbols in the normal CP. First three OFDM symbols (maximum four OFDM symbols for a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
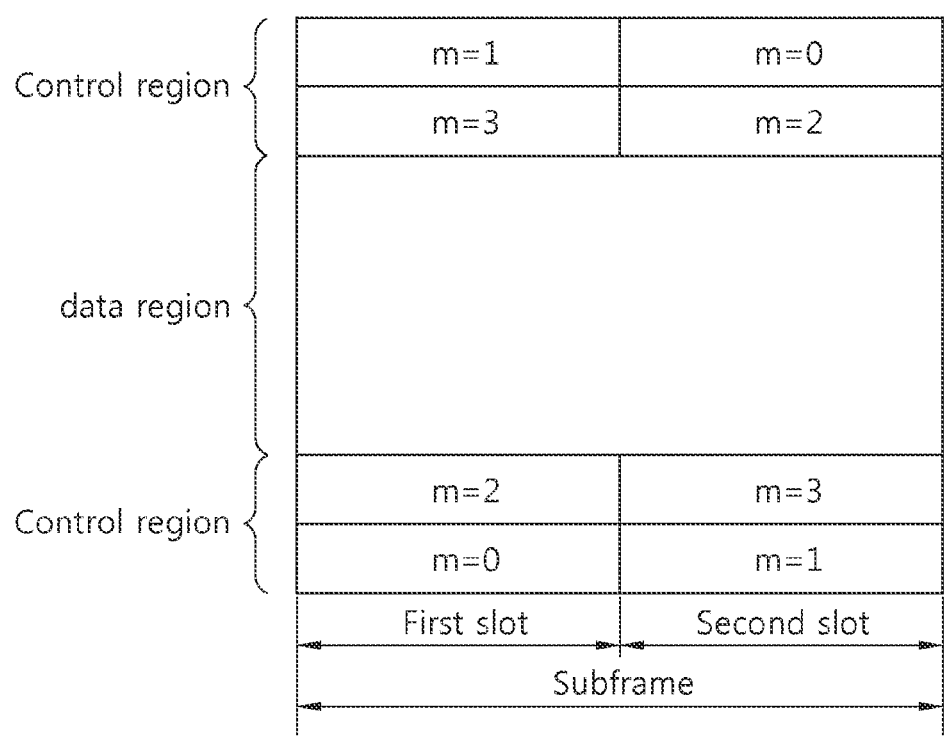
FIG. 5 shows a structure of an uplink subframe.

FIG. 5 shows a structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH for a UE is allocated by a pair of RBs in a subframe. The resource blocks belonging to the pair of RBs occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

To improve a performance of the wireless communication system, a technique is evolved in a direction of increasing density of nodes capable of accessing to an area around a user. A wireless communication system having nodes with higher density can provide a higher performance through cooperation between the nodes.

Figure 6:
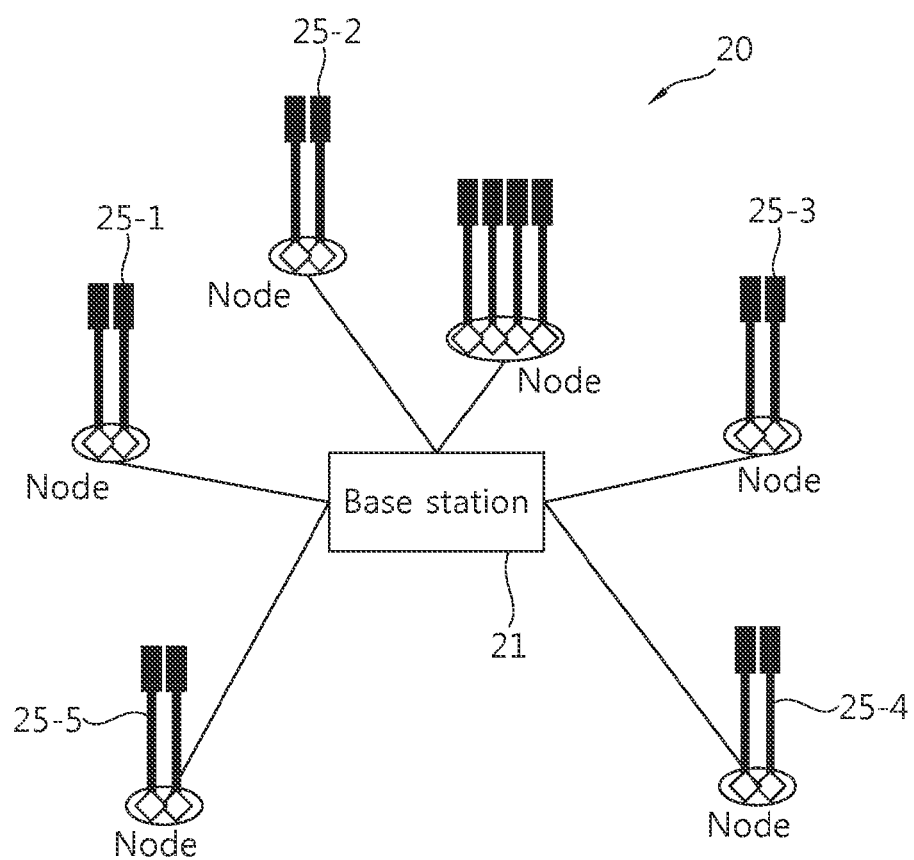
FIG. 6 shows an example of a multi-node system.

FIG. 6 shows an example of a multi-node system.

Referring to FIG. 6, a multi-node system 20 may consist of one BS 21 and a plurality of nodes 25-1, 25-2, 25-3, 25-4, and 25-5. The plurality of nodes 25-1, 25-2, 25-3, 25-4, and 25-5 may be managed by one BS 21. That is, the plurality of nodes 25-1, 25-2, 25-3, 25-4, and 25-5 operate as if they are a part of one cell. In this case, each of the nodes 25-1, 25-2, 25-3, 25-4, and 25-5 may be allocated a separate node identifier (ID), or may operate as if it is a part of an antenna group without an additional node ID. In this case, the multi-node system 20 of FIG. 6 may be regarded as a distributed multi node system (DMNS) which constitutes one cell.

Alternatively, the plurality of nodes 25-1, 25-2, 25-3, 25-4, and 25-5 may have separate cell IDs and perform a handover (HO) and scheduling of the UE. In this case, the multi-node system 20 of FIG. 6 may be regarded as a multi-cell system. The BS 21 may be a macro cell. Each node may be a femto cell or pico cell having cell coverage smaller than cell coverage of a macro cell. As such, if a plurality of cells is configured in an overlaid manner according to coverage, it may be called a multi-tier network.

In FIG. 6, each of the nodes 25-1, 25-2, 25-3, 25-4, and 25-5 may be any one of a BS, a Node-B, an eNode-B, a pico cell eNB (PeNB), a home eNB (HeNB), a remote radio head (RRH), a relay station (RS) or repeater, and a distributed antenna. At least one antenna may be installed in one node. In addition, the node may be called a point. In the following descriptions, a node implies an antenna group separated by more than a specific interval in a DMNS. That is, it is assumed in the following descriptions that each node implies an RRH in a physical manner. However, the present invention is not limited thereto, and the node may be defined as any antenna group irrespective of a physical interval. For example, the present invention may be applied by considering that a node consisting of horizontal polarized antennas and a node consisting of vertical polarized antennas constitute a BS consisting of a plurality of cross polarized antennas. In addition, the present invention may be applied to a case where each node is a pico cell or femto cell having smaller cell coverage than a macro cell, that is, to a multi-cell system. In the following descriptions, an antenna may be replaced with an antenna port, virtual antenna, antenna group, as well as a physical antenna.

Hereinafter, a physical control format indicator channel (PCFICH) is described.

Figure 7:
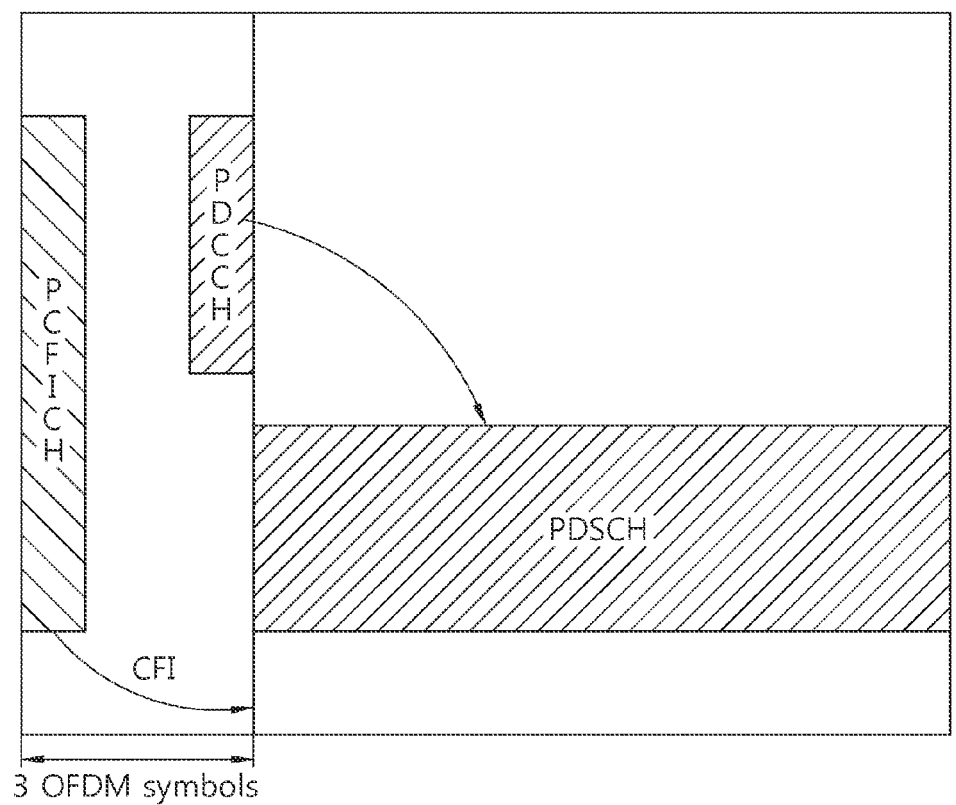
FIG. 7 shows an example where a PCFICH, PDCCH, and PDSCH are mapped to a subframe.

FIG. 7 shows an example where a PCFICH, PDCCH, and PDSCH are mapped to a subframe.

The 3GPP LTE allocates a PDCCH to transmit a downlink control signal intended for controlling UEs. The region to which PDCCHs of a plurality of UEs are mapped is called a PDCCH region or a control region. The PCFICH carries information about the number of OFDM symbols used for allocation of the PDCCH within a subframe. The information about the number of OFDM symbols to which the PDCCH is allocated is called a control formation indicator (CFI). All the UEs within a cell have to search the region to which the PDCCH is allocated, and accordingly, the CIF may be set to a cell-specific value. In general, the control region to which the PDCCH is allocated is allocated to the OFDM symbols at the forefront of a downlink subframe, and the PDCCH may be allocated to a maximum of three OFDM symbols.

Referring to FIG. 7, CIF is set to 3, and accordingly, the PDCCH is allocated to the aforementioned three OFDM symbols within a subframe. The UE detects its own PDCCH within the control region and finds its own PDSCH through the detected PDCCH in the corresponding control region.

A new control channel may be introduced in addition to the existing PDCCH for a distributed multi-node system. Hereinafter, a control channel newly defined is called an enhanced PDCCH (e-PDCCH). The e-PDCCH may be allocated in a data region rather than the existing control region. As the e-PDCCH is defined, a control signal for each node is transmitted for each UE, and the problem of shortage of the PDCCH region can be solved.

Figure 8:
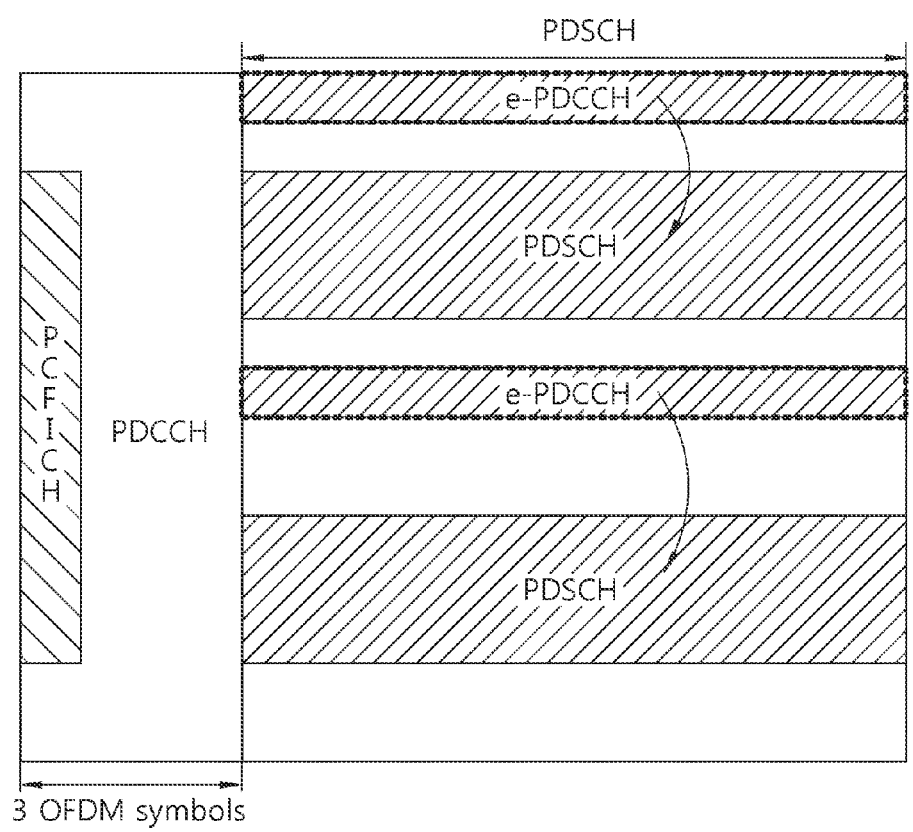
FIG. 8 shows an example of resource allocation through an e-PDCCH.

FIG. 8 shows an example of resource allocation through an e-PDCCH.

The e-PDCCH may be allocated to part of a data region rather than the conventional control region. The e-PDCCH is not provided for the existing legacy UEs, and those UEs supporting the 3GPP LTE rel-11 (hereinafter, they are called rel-11 UEs) may search for the e-PDCCH. The rel-11 UE performs blind decoding for detection of its own e-PDCCH. A PDSCH may be scheduled by the e-PDCCH allocated to the data region. A base station may transmit downlink data to each UE through the scheduled PDSCH. However, if the number of UEs connected to each node is increased, the portion of the data region occupied by the e-PDCCH is enlarged. Therefore, the number of blind decoding that has to be performed by the UE is also increased, thus increasing degree of complexity.

In the same way as a PCFICH indicates a control region to which a PDCCH is allocated, a new channel indicating a region to which an e-PDCCH is allocated may be defined. Hereinafter, the present invention introduces an enhanced PCFICH (e-PCFICH) which indicates a region to which the e-PDCCH is allocated. Also the present invention provides a method for minimizing complexity of blind decoding for a UE to detect the e-PDCCH in an efficient manner.

Figure 9:
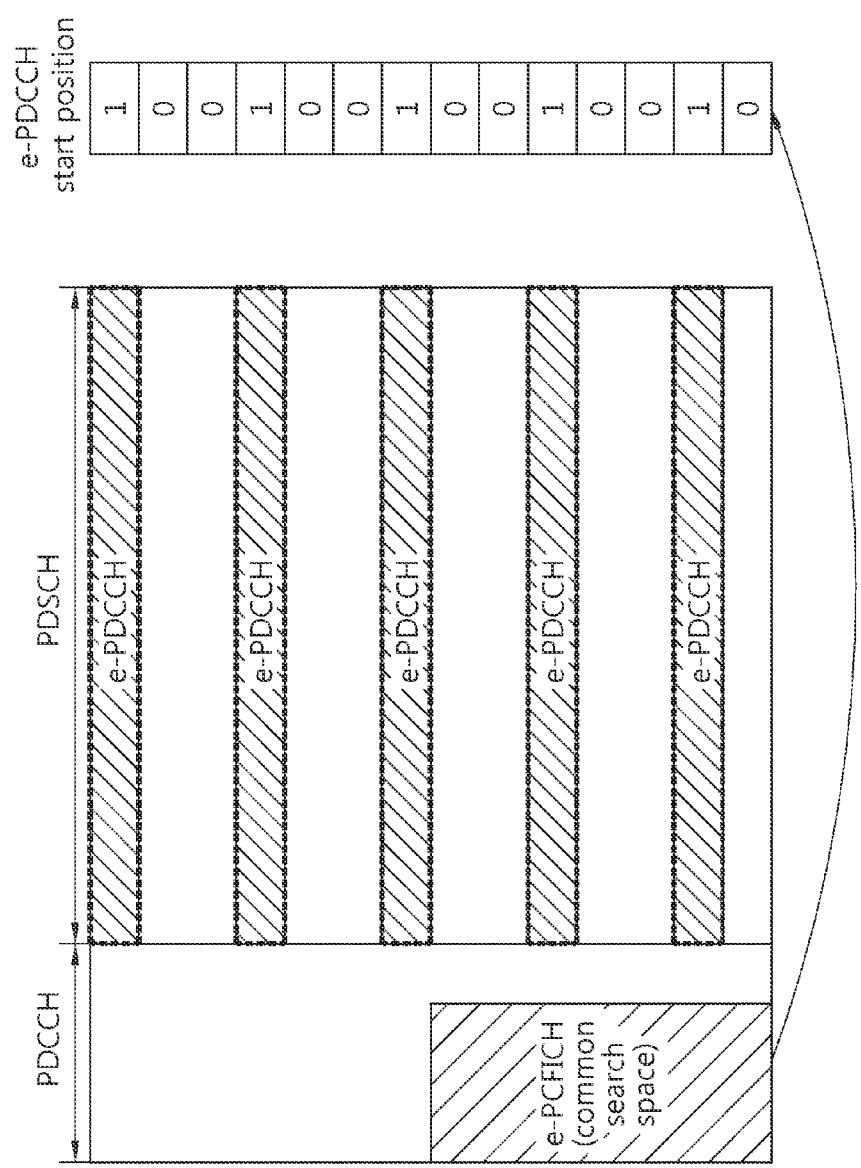
FIG. 9 shows an example where an e-PCFICH indicates a position at which an e-PDCCH is allocated according to a proposed method for allocating a downlink control channel.

FIG. 9 shows an example where an e-PCFICH indicates a position at which an e-PDCCH is allocated according to a proposed method for allocating a downlink control channel.

A base station may transmit information on a start position of the e-PDCCH allocated in a data region through the e-PCFICH allocated in a common search space (CSS) in the existing control region. Hereinafter, the information on the start position of the e-PDCCH transmitted through the e-PCFICH is called an e-PDCCH indicator. In general, the control region may be logically divided into a CSS and a UE-specific search space (USS). Of the two spaces, the CSS corresponds to the region at which a PDCCH, for a downlink control signal transmitted to all of the UEs, is located. It is preferable for the UEs scheduled through the e-PDCCH to allocate the e-PCFICH in the CSS, and the e-PCFICH may be allocated at the position used for the existing PDCCH in the CSS. Unique ratio network temporary identifiers (RNTIs) may be assigned to the rel-11 UEs searching for the e-PDCCH (for example, RRH-RNTIs may be assigned), and each rel-11 UE may detect the e-PCFICH in the CSS by using the unique RNTI.

Referring to FIG. 9, the e-PCFICH includes information on the start position of the e-PDCCH for each resource block (RB) in the PDSCH. The start position of the e-PDCCH for each RB may be represented by a bitmap consisting of 0s and 1s. In the example of FIG. 9, in case that the total number of RBs is 14 (RB index is 0, 1, 2, ... , 13) and the e-PDCCH indicator received through the e-PCFICH is '10010010010010', the e-PDCCH is started in a total of five RBs, the RB indices of which are 0, 3, 6, 9, and 12. At this time, the RB may be an RB in a virtual RB (VRB) domain. Also, since a search space of the e-PDCCH may be formed across multiple RBs, the e-PCFICH may include additional information on a total length of RBs containing the e-PDCCH. The UE may figure out the whole search space by obtaining the start position of the e-PDCCH and the information on the total length of RBs containing the e-PDCCH. Therefore, complexity of blind decoding may be decreased by reducing the range in which detection of the e-PDCCH is performed. The UE may perform blind decoding in the search space of the corresponding e-PDCCH in the same way as the conventional blind decoding process of the USS for the aggregation level 1, 2, 4, and 8 and detects the UE's e-PDCCH.

Meanwhile, an RB may be allocated to a PDSCH in a distributed manner or in a continuous manner. The RB indexed sequentially in the frequency domain is called a physical RB (PRB), and the RB obtained by mapping the PRB one more time is called a virtual RB (VRB). Two types of allocation may be supported for allocation of virtual RBs. A localized type VRB may be obtained by one-to-one direct mapping of PRBs indexed sequentially in the frequency domain. A distributed type VRB may be obtained by distributed or interleaved mapping of PRBs according to specific rules. To indicate the VRB type, the DCI format 1A, 1B, 1C, and 1D, transmitted to allocate the PDSCH through a PDCCH, includes a localized/distributed VRB assignment flag. Whether the VRB is a localized type or a distributed type may be indicated by the localized/distributed VRB assignment flag. Therefore, according to the VRB allocation type, a method for analyzing information transmitted through the e-PCFICH or additional signaling may be needed.

The UE may determine VRB allocation type directly by using the DCI format transmitted periodically through the PDCCH of the CSS. Or, the base station may inform the VRB allocation type through a higher layer in the form of radio resource control (RRC) signaling. In case that information on the VRB allocation type is not transmitted by the conventional signaling method, the VRB allocation type may be informed to the UE by adding a flag to the e-PCFICH.

Regardless of whether the VRB allocation type is localized-type or distributed-type, the e-PDCCH indicator may indicate the start position of the e-PDCCH in the VRB region by using a bitmap. Similarly, the e-PDCCH indicator may be interpreted differently for each UE according to the VRB allocation type. For example, in case that the VRB allocation type is localized-type, the UE may interpret the e-PDCCH indicator as the bitmap indicating the start position of the e-PDCCH in the VRB region as described in FIG. 9. Since the VRB index and PRB index are the same to each other in the localized-type allocation, the e-PDCCH indicator may indicate the start position of the e-PDCCH in the PRB region. Also the UE may construct a search space based on the information on the length of RBs to which the e-PDCCH belongs. The information on the length of RBs to which the e-PDCCH belongs may be predefined or may be changed periodically through a higher layer. In case that the VRB allocation type is distributed-type, the UE may interpret the e-PDCCH indicator by converting the e-PDCCH indicator to another value. For example, in converting the e-PDCCH indicator into another value, the number of is included in the e-PDCCH indicator may be converted to the size of a search space of the e-PDCCH. At this time, the search space of the e-PDCCH may start from a predefined VRB. Since the VRB index and PRB index are different from each other in the distributed-type allocation, the e-PDCCH indicator is unable to indicate the start position of the e-PDCCH in the PRB region but is able to indicate only the start position of the e-PDCCH in the VRB region. In addition, blind decoding may be performed only after the PRB index is converted to the VRB index, and the length of RBs to which the e-PDCCH belongs may correspond to the length information of RBs in the VRB region.

Meanwhile, Table 1 shows system bandwidth configuration of the 3GPP LTE/LTE-A.

TABLE 1

| Channel bandwidth ($BW_{Channel}$) [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Referring to Table 1, in case that channel bandwidth is 10 MHz, the total number of RBs is 50. In case that the channel bandwidth is 20 MHz, the total number of RBs is 100. In other words, as described in FIG. 9, in case that the information on the start position of the e-PDCCH is indicated by a bitmap through the e-PCFICH, a maximum of 100 bits are required when the channel bandwidth is 20 MHz. However, since the e-PCFICH is located in the existing PDCCH, there may be restriction in constructing information on the start position of the e-PDCCH. For example, the conventional PDCCH may be so formed as not to exceed a maximum of 72 bits including 16 cyclic redundancy check (CRC) bits and thus may be allocated to the CSS. The 16 CRC bits are generated based on an RNTI and may be generated when the RRH-RNTI is allocated to each UE. Therefore, the maximum number of bits that can be used in the PDCCH is 56. In other words, in case of channel bandwidths of 15 and 20 MHz where the number of RBs exceeds 56, it may be difficult to indicate the start position of the e-PDCCH for each RB by using a bitmap. Accordingly, a different method for constructing the e-PDCCH is required.

Figure 10:
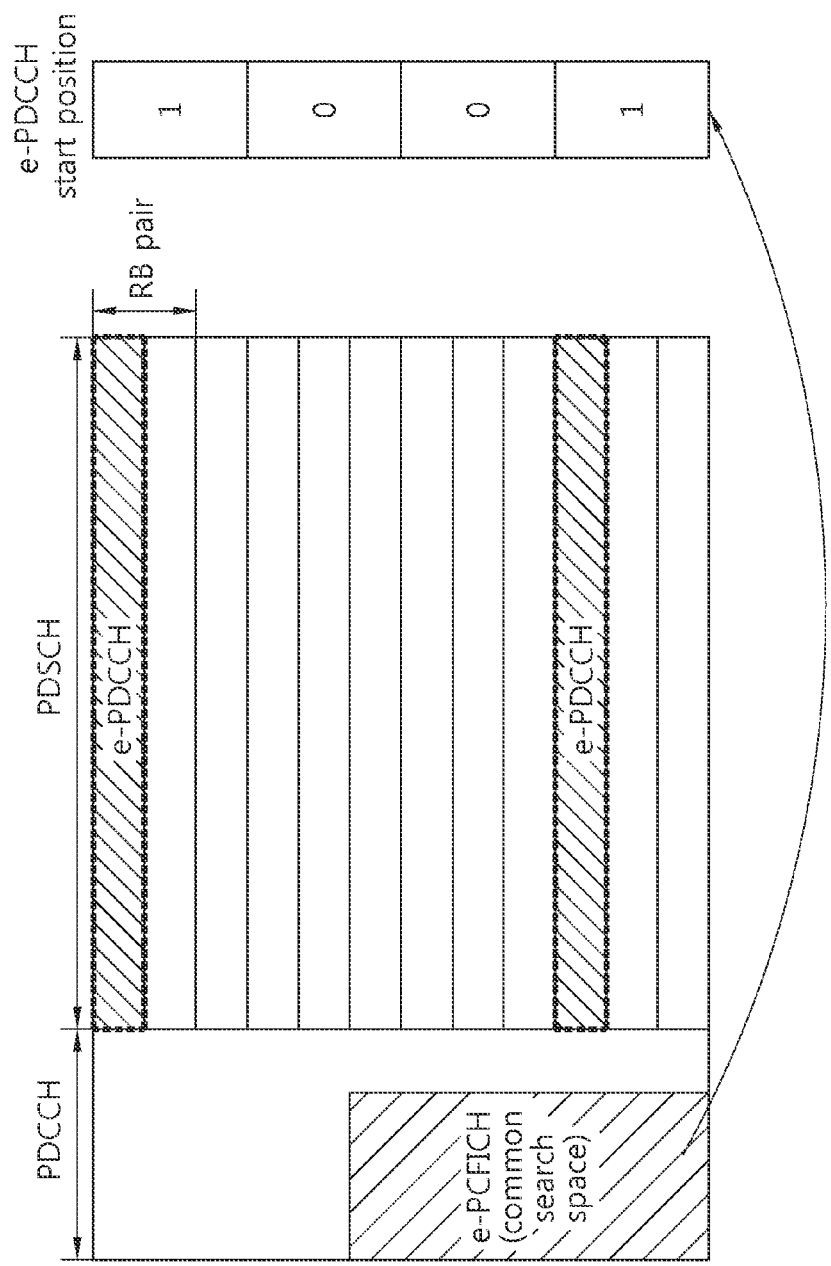
FIG. 10 shows another example where an e-PCFICH indicates a position at which an e-PDCCH is allocated according to a proposed method for allocating a downlink control channel.

FIG. 10 shows another example where an e-PCFICH indicates a position at which an e-PDCCH is allocated according to a proposed method for allocating a downlink control channel.

First of all, instead of indicating the start position of the e-PDCCH in a unit of an RB, the e-PDCCH indicator transmitted through the e-PCFICH may indicate the start position of the e-PDCCH in a unit of RB bundle which comprises a plurality of RBs. At this time, the start position of the e-PDCCH may be predefined in one RB bundle. The number of RBs included in one RB bundle may be defined by a function of size of an RB group (RBG) defined for each bandwidth. For example, the number of RBs included in one RB bundle may be the same as the size of an RBG defined for each frequency bandwidth.

Referring to FIG. 10, it is assumed that the VRB allocation type is localized-type and one RB bundle comprises three RBs, and the start position of the e-PDCCH in each RB bundle is the first RB. If the e-PDCCH indicator transmitted through the e-PDCCH is 1001, the e-PDCCH indicator indicates that the e-PDCCH starts from the first RB in the first RB bundle and the third RB bundle. In other words, the start position of the e-PDCCH in the entire PRB region is indicated by {{1, 0, 0}, {0, 0, 0}, {0, 0, 0}, {1, 0, 0}}, and a total of two e-PDCCHs may start from the PRB indexed with 0 and 9. The start position of the e-PDCCH in the RB bundle may be changed through signaling. Also, in case that the VRB allocation type is distributed-type, the method described above may be applied in the same way by using a VRB bundle in the logical domain.

On the other hand, the position at which the e-PDCCH is allocated may be limited. In other words, the e-PDCCH may be allocated to a specific number of RBs regardless of the system frequency band. Accordingly, regardless of the system frequency band, the start position of the e-PDCCH may be indicated according to information bits of fixed length.

Figure 11:
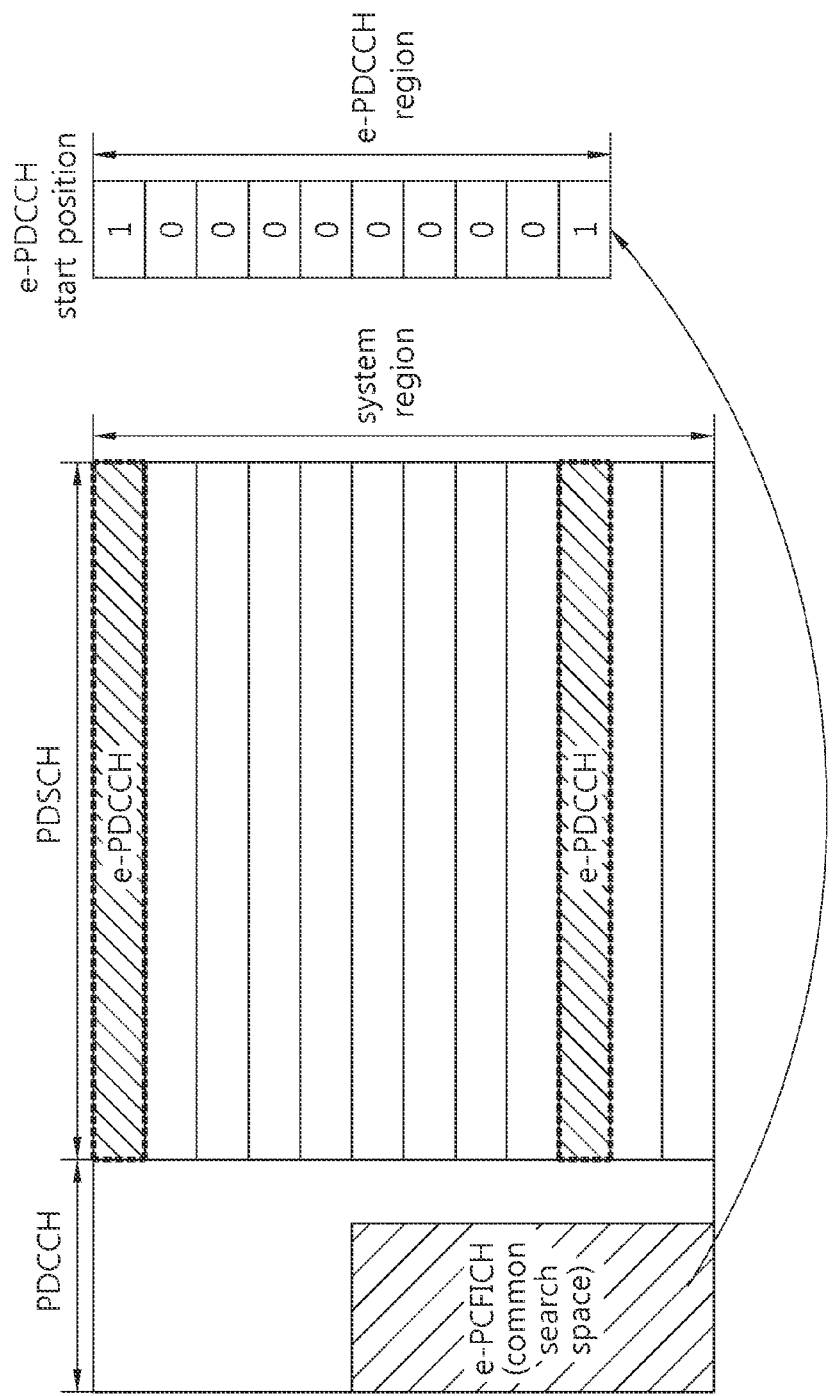
FIG. 11 shows another example where an e-PCFICH indicates a position at which an e-PDCCH is allocated according to a proposed method for allocating a downlink control channel.

FIG. 11 shows another example where an e-PCFICH indicates a position at which an e-PDCCH is allocated according to a proposed method for allocating a downlink control channel.

Referring to FIG. 11, it is assumed that the VRB allocation type is localized-type and a system frequency band comprises 12 RBs (where RB index is 0, 1, . . . , 11), and the e-PDCCH indicator consists of 10 bits. Accordingly, the e-PDCCH indicator may indicate the start position of the e-PDCCH in 10 RBs out of the 12 RBs. The remaining two RBs may correspond to a region predefined between the base station and the UE not to allocate the e-PDCCH. Since the e-PDCCH indicator is '1000000001' in FIG. 11, the UE may know that the e-PDCCH starts from the first RB and the 10-th RB. The RB determined not to allocate the e-PDCCH may be changed through signaling. Meanwhile, in case that the VRB allocation type is distributed-type, too, the method of restricting VRBs in the logical region for allocation of the e-PDCCH may be applied in the same manner.

Meanwhile, the description above is based on the assumption that the e-PCFICH is allocated in the CSS of the control region. However, the present invention is not limited to the above assumption, and the e-PCFICH may be allocated to the UE-specific search space (USS) of the existing control region. The e-PDCCH indicator may be transmitted through the e-PCFICH allocated to the USS.

Different from the CSS, since the USS is based on the unique ID or RNTI of the UE, it is necessary to assign an additional identifier to each UE or each UE group including a plurality of UEs for detection of the e-PCFICH. An auxiliary identifier such as RRH-ID or RRH-RNTI may be used by the base station to identify each node, and in case that the number of UEs in a cell is small, the auxiliary identifier may be used to identify each UE. For example, in case that a UE group is generated for each node and the auxiliary identifier is assigned only to the UEs belonging to the corresponding UE group, each UE in the corresponding UE group may know the start position of the e-PDCCH by detecting the e-PCFICH for each node. Since e-PCFICH information bits may be constructed flexibly according to the number of UEs in a cell, shortage of the control region due to addition of the e-PCFICH may also be somewhat resolved.

Similarly, the e-PCFICH may be constructed for each UE. If each UE has a unique start position of the e-PDCCH, the size of the e-PDCCH may be represented by $\lceil \log_2 N \rceil$, where N is the total number of RBs. In other words, if the total number of RBs across the system frequency band is 50, the e-PDCCH indicator may occupy six bits ($\lceil \log_2 50 \rceil=6$). Accordingly, only the minimum amount of information bits are required to form the e-PCFICH, and the e-PCFICH may be constructed by using single CCE. That is to say, the e-PCFICH may be allocated to the control region for the aggregation level 1 comprising only one CCE. If the number of UEs is below a predetermined threshold, a serious shortage of the existing control region may not be caused.

Figure 12:
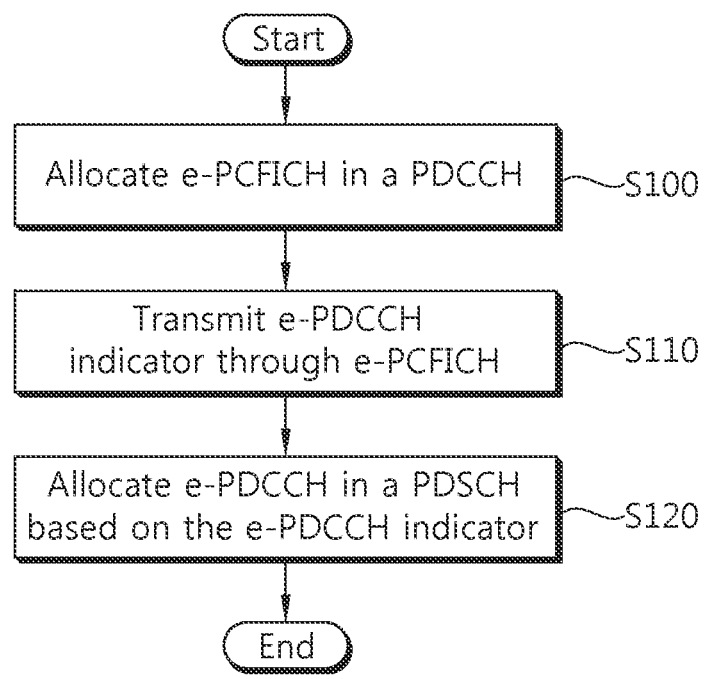
FIG. 12 shows an embodiment of a proposed method for allocating a downlink control channel.

FIG. 12 shows an embodiment of a proposed method for allocating a downlink control channel.

In step S100, the base station allocates the e-PCFICH in the control region. In the step of S110, the base station transmits the e-PDCCH indicator through the e-PCFICH. The e-PDCCH indicator includes information on the start position of the e-PDCCH and may be transmitted through the CSS or USS. In step S120, the base station may allocate the e-PDCCH in the data region based on the e-PDCCH indicator.

Figure 13:
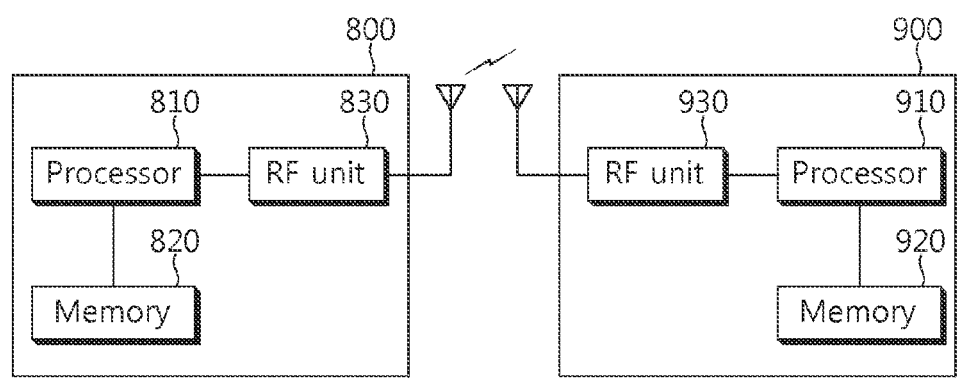
FIG. 13 is a block diagram showing wireless communication system to implement an embodiment of the present invention.

FIG. 13 is a block diagram showing wireless communication system to implement an embodiment of the present invention.

A BS 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for a base station transmitting a signal associated with a control region including a common search space and a user equipment (UE)-specific search space in a wireless communication system, the method comprising:
   allocating a radio network temporary identifier (RNTI) only to at least one UE supporting an enhanced physical downlink control channel (e-PDCCH);
   allocating a physical control format indicator channel (PCFICH) indicating a number of Orthogonal Frequency Division Multiplexing (OFDM) symbols dedicated for the control region and a physical downlink control channel (PDCCH) in the control region;
   configuring an enhanced PCFICH (e-PCFICH) in the PDCCH, the e-PCFICH masked based on the RNTI and included in the UE-specific search space and including an enhanced physical downlink control channel (e-PDCCH) indicator, the e-PDCCH indicator is a bitmap indicating at least one resource block (RB) group carrying the e-PDCCH, each RB group including a plurality of RBs and only an initial RB in each resource block group is used for carrying the e-PDCCH;
   transmitting the PCFICH and the PDCCH including the e-PCFICH in the control region;
   allocating the e-PDCCH based on the e-PDCCH indicator, the e-PDCCH included in a data region; and
   transmitting the e-PDCCH in the data region,
   wherein a plurality of OFDM symbols dedicated for the data region follow the number of OFDM symbols dedicated for the control region.

2. The method of claim 1, wherein the base station includes a plurality of nodes.

3. The method of claim 1, wherein the UE-specific search space is only monitored by the at least one UE to which the RNTI is allocated.

4. A base station (BS) transmitting a signal associated with a control region including a common search space and a user equipment (UE)-specific search space in a wireless communication system, the BS comprising:
   a radio frequency unit configured to transmit a signal; and
   a processor controlling the radio frequency unit to:
   allocate a radio network temporary identifier (RNTI) only to at least one UE supporting an enhanced physical downlink control channel (e-PDCCH);
   allocate a physical control format indicator channel (PCFICH) indicating a number of Orthogonal Frequency Division Multiplexing (OFDM) symbols dedicated for the control region and a physical downlink control channel (PDCCH) in the control region;
   configure an enhanced PCFICH (e-PCFICH) in the PDCCH, the e-PCFICH masked based on the RNTI and included in the UE-specific search space and including an enhanced physical downlink control channel (e-PDCCH) indicator, the e-PDCCH indicator is a bitmap indicating at least one resource block (RB) group carrying the e-PDCCH, each RB group including a plurality of RBs and only an initial RB in each resource block group is used for carrying the e-PDCCH;
   transmit the PCFICH and the PDCCH including the e-PCFICH in the control region; allocate the e-PDCCH based on the e-PDCCH indicator, the e-PDCCH is included in a data region; and
   transmit the e-PDCCH in the data region,
   wherein a plurality of OFDM symbols dedicated for the data region follow the number of OFDM symbols dedicated for the control region.

5. The BS of claim 4, further comprising a plurality of nodes.

* * * * *